United States Patent [19]
Motycka

[11] 3,931,708
[45] Jan. 13, 1976

[54] VARIABLE FLAP FOR A VARIABLE PITCH DUCTED FAN PROPULSOR

[75] Inventor: David L. Motycka, Glastonbury, Conn.

[73] Assignee: United Technologies Corporation, Hartford, Conn.

[22] Filed: Oct. 11, 1973

[21] Appl. No.: 405,606

[52] U.S. Cl............. 60/226 A; 60/271; 239/265.33
[51] Int. Cl.² .................. F02K 1/12; F02K 3/06
[58] Field of Search...... 60/226 R, 226 A, 271, 224; 239/265.11, 265.19, 265.33, 265.37–265.43

[56] References Cited
UNITED STATES PATENTS

| | | | |
|---|---|---|---|
| 3,044,258 | 7/1962 | Carlton et al.................. | 239/265.33 |
| 3,622,075 | 11/1971 | Harris........................... | 239/265.43 |
| 3,747,341 | 7/1973 | Davis............................. | 60/226 A |
| 3,747,343 | 7/1973 | Rosen............................ | 60/226 R |
| 3,814,325 | 6/1974 | McCardle et al.............. | 181/33 HD |

*Primary Examiner*—Carlton R. Croyle
*Assistant Examiner*—Robert E. Garrett
*Attorney, Agent, or Firm*—Norman Friedland

[57] ABSTRACT

A movable flap at the exit end of a variable pitch ducted fan is configured and dimensioned in order to provide an effective duct configuration for good cruise performance, improved thrust coefficient of the fan duct nozzle and a desirable inlet when the fan is operating in the reverse pitch mode.

4 Claims, 1 Drawing Figure

U.S. Patent Jan. 13, 1976 3,931,708
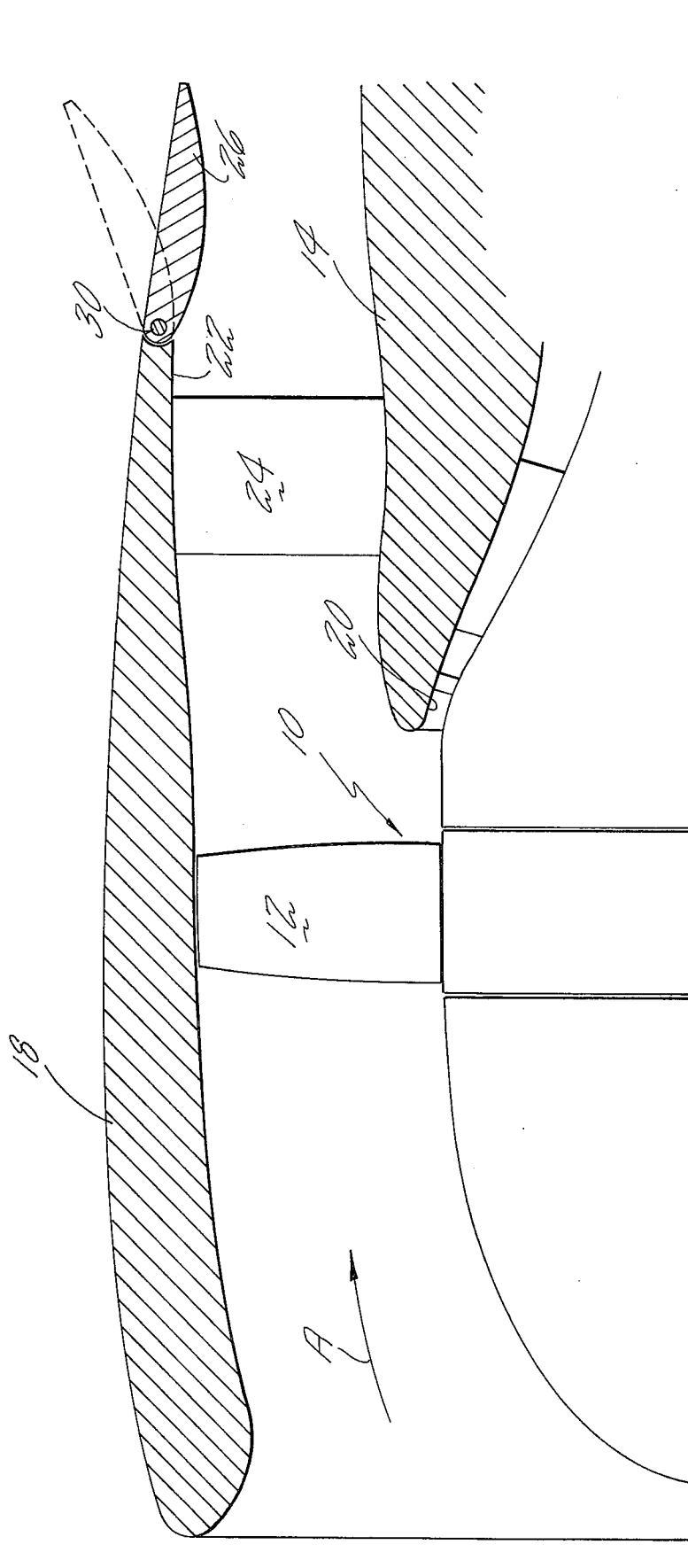

VARIABLE FLAP FOR A VARIABLE PITCH DUCTED FAN PROPULSOR

BACKGROUND OF THE INVENTION

This invention relates to variable pitch ducted fans and particularly to an improved variable area discharge convergent-divergent nozzle of the duct and constitutes an improvement over the flap design disclosed in a companion application Ser. No. 405,605 entitled Bypass Ducted Fan Propulsor by Carl Rohrbach filed on even date and assigned to the same assignee.

While the utilization of variable flaps on a duct are well known in the art, such flaps heretofore would never be designed to form a low area ratio convergent-divergent nozzle. With the advent of the variable pitch fan aircraft propulsors which are utilized to provide reverse capabilities it has become desirable to provide bellmouth shaped inlet of the fan duct exit.

I have found that I can improve the effectivenss of the duct for both the cruise and reverse mode performances by designing the flap to provide a convergent-divergent nozzle when the flaps are in their closed position for cruise operation and when in the open position form a desirable inlet for the reverse pitch operation. Moreover, I have found that for low fan pressure ratios I can increase the flow coefficient of the fan duct nozzle in such a manner that during the periods of operation where the pressure ratio across the fan is at a low value the improvement in the flow coefficient tends to move the operation of the fan away from the surge line and enhances the effectiveness of the fan particularly during takeoff, landing and ground operation.

Additionally by disposing the pivot point of the flap in a discrete and judicious location serves not only to prevent flow disturbances through the duct but tends to improve the effectiveness of the bellmouth shaped inlet during reverse mode.

SUMMARY OF THE INVENTION

An object of this invention is to provide for a variable pitch ducted fan and improved variable flap.

A still further object of this invention is to provide for a ducted fan a variable flap that provides a convergent-divergent nozzle when in its closed position and to provide a bellmouth shaped inlet when in its open position.

A still further object of this invention is to provide a movable flap for variable pitch ducted fan which variable flap is pivoted at a point which is judiciously and discretely located within the duct to enhance the flow capabilities thereof.

Other features and advantages will be apparent from the specification and claims and from the accompanying drawings which illustrate an embodiment of the invention.

BRIEF DESCRIPTION OF THE DRAWING

The sole FIGURE is a view partly in schematic and partly in section illustrating the movable flap of this invention.

DESCRIPTION OF THE PREFERRED EMBODIMENT

As can be seen from the sole FIGURE the propulsor for an aircraft includes a fan generally illustrated by reference number 10 comprising a plurality of variable pitch blades (only one being shown) 12 circumferentially disposed for rotating motion driven by the engine 14, (only the inlet portion being shown). A spinner 16 may also be incorporated. The fan is surrounded by a suitable bypass duct 18 so that air during cruise and takeoff flight regimes flows into the duct, through the fan blades and a portion is ingested into the engine through inlet 20 while the remaining portion is discharged through the exit 22 of duct 18 via anti-swirl vanes 24.

Flaps 26 at the exit end of the duct 18 are designed to open and form a substantially bell-shaped nozzle when the blades are moved in the reverse position. In this mode, air now flows into the exit end 22, via the flaps 26, anti-swirl vanes 24 where a portion is ingested by the engine via inlet 20 and the remaining portion is passed through the blades 12, imparting a reverse thrust utilized in the landing regime of the aircraft.

In accordance with this invention the flaps are designed and configured to form a low area ratio convergent-divergent nozzle when the flaps are in the closed position. Additionally, the pivot point 30 is judiciously located so as to form a smooth converging passage for the flow of air when the air is passing through the duct in the forward direction depicted by arrow A. Similarly when the flow is reversed in direction the pivot point is located so that a smooth opened flap forms converging passage to the air entering the duct from the rear.

It should be understood that the invention is not limited to the particular embodiments shown and described herein, but that various changes and modifications may be made without departing from the spirit or scope of this novel concept as defined by the following claims.

I claim:

1. For a variable pitch ducted fan driven by a turbine type of power plant in which the duct surrounds and extends beyond the inlet of the power plant and the fan is movable from a positive to a negative pitch to reverse the flow of air in the duct, a variable flap at the exit end of the duct pivotally mounted aft of said inlet, said variable flap having an inwardly convex inner wall protruding into the duct to define a reduced diameter of the duct and a nozzle when said flap is in the normal positive pitch position and defining a substantially aerodynamically smooth surface for directing air from outside of said duct through the exit end into said inlet and said fan when in the reverse position.

2. For a variable pitch ducted fan as claimed in claim 1 wherein said nozzle is of the convergent-divergent type.

3. For a variable pitch ducted fan as claimed in claim 2 wherein said variable flap is pivoted to said duct at a point where the flap flares into the arc of the convex section.

4. For a variable pitch ducted fan as claimed in claim 2 wherein said variable flap forms a substantially bell-shaped member.

* * * * *